UNITED STATES PATENT OFFICE.

EMILE A. FOURNEAUX, OF NEW YORK, N. Y., ASSIGNOR TO HERMAN A. METZ, OF BROOKLYN, NEW YORK.

PROCESS OF MAKING LAKES FROM SULFUR DYES.

SPECIFICATION forming part of Letters Patent No. 714,687, dated December 2, 1902.

Application filed April 5, 1902. Serial No. 101,515. (No specimens.)

*To all whom it may concern:*

Be it known that I, EMILE A. FOURNEAUX, a citizen of the United States, residing in New York, borough of Manhattan, and State of New York, have invented certain new and useful Improvements in Processes of Making Lakes from Sulfur Dyes, of which the following is a specification.

The so-called "sulfur dyes," which are obtained by the action of sulfur, sulfids, and other sulfur compounds on various organic bodies, while highly appreciated in the art of dyeing on account of their great fastness, could not be applied successfully heretofore to the manufacture of lake and pigment colors. They are generally considered quite unsuitable for this application, probably because lakes made from these dyes by the processes of manufacturing commonly employed are weak, dull, and entirely worthless from a practical standpoint. This is believed to be due to the fact that these manufacturing processes are not in harmony with the nature of the sulfur dyes rather than to an organic inability of these dyes to yield good lakes. As the manufacture of such lakes from the sulfur dyes would be a very important improvement in the art of making lake and pigment colors, as it would make a whole class of valuable dyes available for making lake and pigment colors, I have endeavored to find such a process and obtained thereby bright and strong lakes from sulfur dyes which are very valuable on account of their excellent working qualities and great fastness. For this purpose my invention consists of the process of making lakes from sulfur dyes by first precipitating a solution of the commercial dyes with a salt of an earth alkali metal, removing all soluble impurities by washing, and then forming the lake by adding to the alkaline liquor containing the above precipitate solutions of suitable metallic salts and subjecting the liquor to heat until the lake formed attains its greatest brightness.

In carrying out my improved process the sulfur dye in its commercial form is dissolved in water. Sometimes it is necessary to add sodium sulfid or an alkali. This solution is mixed with a suitable quantity of a salt of an earth alkali metal, such as calcium, strontium, or barium. A precipitate is formed which contains the bulk of the dye and the earth alkali metal, probably combined in the form of a salt, while the soluble impurities contained in the commercial sulfur dye—such as sulfids, polysulfids, and others—which as a rule cannot be removed therefrom without seriously affecting the solubility of even the chemical nature of the dye, remain in the mother-liquor and can be entirely removed from the precipitate, which as a rule is either quite insoluble or very little soluble in water, by exhaustive washing with this solvent. This precipitate is then suspended in water containing a certain amount of an alkali, such as sodium or potassium carbonate or the corresponding hydrates, and a suitable base for the lake, such as aluminium hydrate, aluminium phosphate, blanc-fixe, barytes, and so on. As a rule the best way to proceed is to heat the precipitate and the solution of the alkali to the boil and then add the base in suspension in water. Finally add the solution of a suitable metallic salt and continue heating until the lake formed attains its greatest intensity and beauty. The following salts were found to be most suitable for the purpose: salts of aluminium, chrome, nickel, cobalt, zinc, and copper, especially the sulfates, also salts of lead, alkali chromates and bichromates, and others. These salts can be used alone or in conjunction. It is most essential for the formation of bright and strong lakes that the solution should be alkaline throughout the process in precipitating the earth alkali compounds, as well as in transforming them into a lake by the action of the metallic salts. Instead of adding a base to the solution before precipitating with the metallic salts the base can be precipitated at the same time with the lake by adding suitable ingredients to the earth alkali compound in suspension and to the precipitating metallic salt. I do not confine myself to any one special sulfur dye, as most of the sulfur dyes known at present give good results by this process. The sulfur dyes can be combined with other dyes—such as basic colors, acid colors, alizarin colors—by suitably adding these colors before precipitating. The lakes so obtained are then washed and dried in the usual way.

Example I: Thirty pounds melanogene-blue B are dissolved in fifty gallons boiling water and precipitated with a solution of eight pounds barium chlorid in ten gallons water. The liquor is then heated to the boil, the precipitate allowed to settle, and washed by decantation until all impurities are removed. Then add the solution of thirty-six pounds of potassium carbonate and heat to the boil, allow to cool, and add the solution of sixty-two pounds of aluminium sulfate in fifty gallons water. Heat slowly to about 180° Fahrenheit, allow to settle, wash by decantation, filter, press, and dry. This gives a blue lake.

Example II: The precipitate obtained from thirty pounds melanogene-blue B and eight pounds barium chlorid, as above, is heated to the boil with the solution of five pounds of potassium carbonate. Twenty-eight pounds of aluminium sulfate are dissolved in water and precipitated with a solution of fourteen pounds of commercial sodium carbonate. The precipitate is well washed by decantation and is added to the above liquor, and finally a solution is added prepared by dissolving three pounds blue-stone and two pounds zinc sulfate in twelve gallons water and adding ammonia until the precipitate first formed is entirely dissolved again. Then heat to about 150° Fahrenheit, wash, filter, and press. This formula gives a black lake.

Example III: Thirty pounds thiogene-brown are dissolved in fifty gallons of boiling water. The solution is allowed to cool and precipitated with a solution of twenty pounds of barium chlorid in twenty-five gallons of water. The precipitate is washed by decantation until all soluble impurities are removed. Then add the solution of thirty-two pounds of potassium carbonate, heat to the boil, allow to cool, and add the solution of fifty-two pounds of aluminium sulfate in fifty gallons of water. Finally introduce a solution obtained by dissolving two pounds of potassium bichromate in three gallons of water and neutralize with ammonia. Heat to the boil, wash by decantation, filter, and press. This gives a brown lake.

Having thus described my invention, I claim as new and desire to secure by Letters Patent—

The process herein described of making lakes from sulfur dyes, which consists in precipitating the solution of a commercial sulfur dye with a salt of an earth alkali metal, removing all soluble impurities by washing, then forming the lake by adding to the alkaline liquor containing the above precipitate a solution of a suitable metallic salt, and finally heating the liquor until the lake formed attains its greatest brightness, substantially as set forth.

In testimony that I claim the foregoing as my invention I have signed my name in presence of two subscribing witnesses.

EMILE A. FOURNEAUX.

Witnesses:
PAUL GOEPEL,
HENRY SUHRBIER.